United States Patent [19]

Lachonius et al.

[11] Patent Number: 4,967,897
[45] Date of Patent: Nov. 6, 1990

[54] CONVEYOR WITH A MULTIPLE PART BEAM

[75] Inventors: Leif Lachonius, Surte; Göran Abbestram, Göteborg, both of Sweden

[73] Assignee: Aktiebolaget SKF, Goteborg, Sweden

[21] Appl. No.: 780,429

[22] Filed: Sep. 26, 1985

[30] Foreign Application Priority Data

Nov. 20, 1984 [SE] Sweden .................................. 8405826

[51] Int. Cl.⁵ ............................................. B65G 21/20
[52] U.S. Cl. .................................. 198/841; 198/860.1
[58] Field of Search ............................. 198/841, 860.1

[56] References Cited

U.S. PATENT DOCUMENTS

| | | | |
|---|---|---|---|
| 3,605,994 | 9/1971 | Parlette | 198/841 X |
| 3,669,244 | 6/1972 | Pagdin et al. | 198/841 |
| 3,669,247 | 6/1972 | Pulver | 198/841 |
| 4,164,283 | 8/1979 | Flajnik | 198/841 X |
| 4,269,302 | 5/1981 | Garvey | 198/841 X |

FOREIGN PATENT DOCUMENTS 2069442 8/1981 United Kingdom ............... 198/841

Primary Examiner—Robert J. Spar
Assistant Examiner—John Vanden Bosche
Attorney, Agent, or Firm—Eugene E. Renz, Jr

[57] ABSTRACT

In a conveyor comprising a conveyor chain and a beam supporting the chain, a beam section is composed by four substantially equal beam parts having an L-profile, and spacing an/or joint elements on which the beam parts are mounted, preferably with screw joints. The assembled beam has a rectangular section with openings in two opposing sides, the openings being spaces between two beam parts, at least one space forming a groove for a conveyor chain.

1 Claim, 1 Drawing Sheet

CONVEYOR WITH A MULTIPLE PART BEAM

BACKGROUND OF THE INVENTION

The present invention relates to improvements in conveyors and more specifically to a novel beam assembly characterized by novel features of construction and arrangement facilitating ease and economy of assembly.

Earlier known devices of this kind comprise a beam made from an elongated member made in one piece and having a suitable cross section profile. As a rule, long lengths of beams with a given cross section shape are produced by extruding a suitable material through a nozzle having a shape corresponding to the desired profile. The profile of a beam which is suitable for supporting a conveyor chain is relatively complicated, and the beam must therefore be made of a material which is particularly suitable for extrusion, e.g. aluminum or other material with a comparatively low resistance to deformation, if the beam is to be produced by extrusion.

In some contexts, however, it is unsuitable or even impossible to use beams of e.g. aluminum, which is a material with a comparatively poor strength and resistance to certain chemical influence. In dairies, for example, all the equipment, also the conveyor, which is in contact with milk is washed frequently, whereby strong basic solvents are used in the washing fluid. Aluminum is not suitable in such an environment, since it is dissolved by the washing fluid.

Conveyors with beams of stainless steel are normally used in such conditions. Stainless steel is unsuitable for extruding, and therefore hitherto known constructions are made of sheet metal parts which are welded together. Welding requires a lot of afterwork, such as steeping and polishing, and the beam is difficult to treat and form to suit the conditions prevailing on the spot where the conveyor is to be mounted.

SUMMARY OF THE INVENTION

The purpose of the present invention is to produce a conveyor of the kind stated above, which conveyor has a beam composed of simple elements which can be mass produced and shaped in a simple and inexpensive manner and be put together with simple tools. To this end in accordance with the present invention, a beam assembly for a conveyor is provided which is of generally H-shaped cross section to define upper and lower runs for a conveyor chain. The beam assembly comprises spaced jointing elements consisting of plate members each of generally U-shaped profile, a connecting element connecting the plate members, four elongated beam members of generally the same L-shaped cross section made of flat sheet metal and formed to the L-shaped configuration by pressing. The beam members are mounted in opposing pairs to the jointing elements whereby the cross section of the assembled beam parts forms a rectangle with openings in two opposing sides and whereby the corners of the L-profiles define the corners of the rectangle. The opening between beam parts constitute grooves or runs for the conveyor chain.

Such a conveyor can be designed so as to be easily assembled with hand tools. The beam is preferably made of e.g. stainless steel parts and has an open profile which permits easy cleansing. The parts of the beam are easily bent to provide the finished conveyor with horizontal and vertical curves. The beam can preferably be shaped with an open groove in the side for mounting e.g. a rail and support fittings and for simplifying cleansing. The beam components can be produced inexpensively by e.g. rolling.

BRIEF DESCRIPTION OF THE DRAWINGS

The following is a detailed description of the invention with reference to the accompanying drawing, in which.

DESCRIPTION OF THE PREFERRED EMBODIMENT

Figure 1:
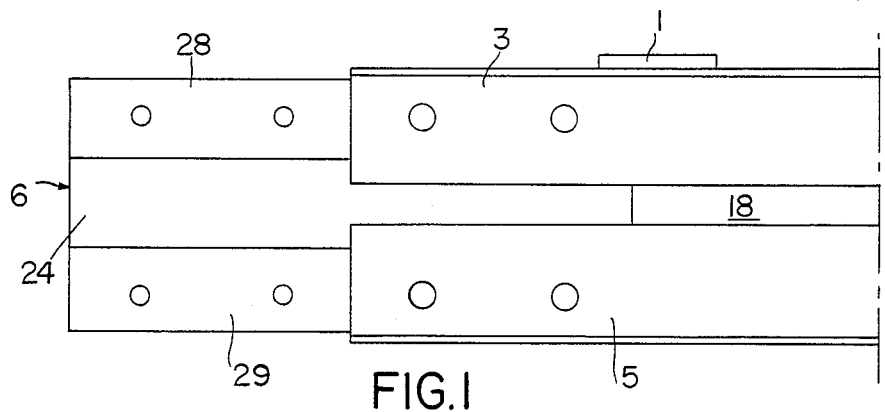
FIG. 1 shows a side view.
Figure 2:
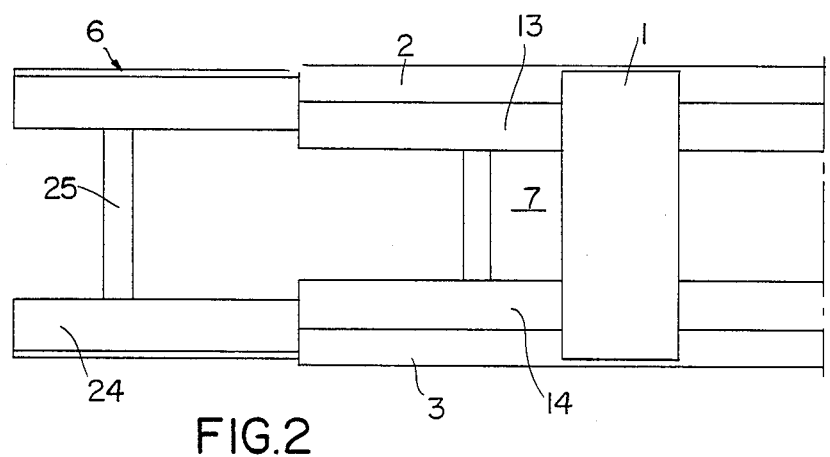
FIG. 2 shows a top view.
Figure 3:
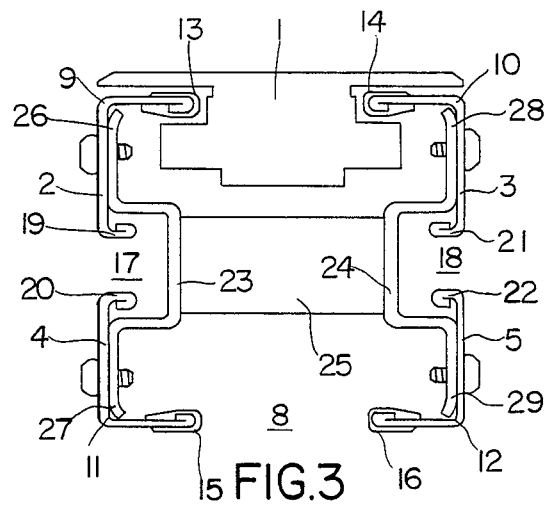
FIG. 3 shows an end view of a portion of a conveyor for horizontal transport according to one embodiment of the invention.

The conveyor shown in the figures comprises a conveyor chain, only one link 1 of which being shown for the sake of simplicity. The chain runs in a groove in a beam. The beam is composed of a number of sections with limited length. An end portion of one section is shown in the drawing. This section comprises four parts 2, 3, 4, 5 which are substantialy identical and can be produced by cutting an elongated bar into suitable lengths. The beam parts have an L-shaped cross section profile, as appears from FIG. 3, and are mounted on spacing and/or jointing elements 6 by which two beam sections can be jointed. The end portions of the beam parts and the elements 6 are perferably provided with screw holes, so that the beam can be assembled and lengthened by screwing together the elements to be jointed, which can be made in a simple manner. Assembly is made so that the finished beam has a substantially rectangular cross section (FIG. 3) with openings 7, 8 in two opposing sides and with the edges 9, 10, 11, 12 of the respective L-shaped profiles in the corners. The openings are spaces between two beam parts 2, 3 and 4, 5, respectively. At least one opening serves as a groove for a conveyor chain. The drawing shows one chain link in the space defining the opening 7. In many cases the beam supports a closed chain with a return portion on the opposite of the beam in relation to the load carrying side. In the device shown in the drawing a return portion can be arranged in the space defining the opening 8, whereby the beam is preferably symmetrical in relation to a central horizontal plane. In order to improve the sliding properties for the chain when it moves along the groove, those edges of the beam parts which limit the groove are provided with a plastic slide strip 13, 14, 15, 16. The conveyor usually has to be provided with various accessories, such as rail and support fittings, which are to be fastened to the beam sides. To this end, and in order to improve the cleansing possibilities, the two other opposite beam sides are provided with openings 17, 18 in the space between two beam parts. These spaces can be limited by opposite flanges 19, 20, 21, 22 which extend from oppsing edges of the respective beam parts and towards the interior of the beam. The flanges act as stiffening means for the beam and as guidance for the mounted accessories. The elements 6 are suitably shaped with two plates 23, 24 with substantially U-shaped profiles and arranged with the openings facing away from each other. The plate are jointed by an element 25 arranged between the bottoms of the plates. The flanges 19, 20, 21, 22 of the L-profiled beam parts 2, 3, 4, 5 are inserted into the openings of the U-profiled plates 23, 24. The beam parts can be jointed to the elements 6 by e.g. screws. In a preferably embodiment, the edges of the U-profiled plates are provided with outwardly folded flange portions 26, 27, 28, 29 which abut against those sides of the legs of the L-profiled beam parts which face the interior of the beam, whereby the beam parts can be fastened to the elementts 6 by providing screws through the abutting surfaces.

The beam parts can be provided with perforations for drainage beside the above-mentioned screw holes, and they can be kept together by spacing elements also in regions between the ends of each section, whereby the elements can be shaped as shortened embodiments of the jointing elements 6. The L-profiled beam parts can easily be cut into desired lengths and be individually bent to be assembled into beam sections with a desired curvature and length. The sections can also be connected to e.g. pulleys and drive mechanisms for the conveyor chain.

What is claimed is:

1. A beam assembly for a conveyor of generally H-shaped cross section defining upper and lower runs for a conveyor chain comprising spaced jointing elements (6) consisting of plate members (23, 24) each of generally U-shaped profile, a connecting element (25) connecting the plate members, four elongated beam members (2, 3, 4, 5) of generally the same L-shaped cross section made of flat sheet metal and formed to the L-shaped configuration by pressing, means mounting the beam members in opposing pairs to said spacing and jointing elements (6) whereby the cross section of the assembled beam parts forms a rectangle with openings (7, 8) in two opposing sides whereby the corners (9, 10, 11, 12) of the L-profiles define the corners of the rectangle and openings (7, 8) between the beam parts constituting grooves or runs for a conveyor chain, the rims of the beam parts (2, 3, 4, 5) defining the groove (7, 8) for the conveyor chain being provided with plastic slide strips (13, 14, 15, 16), the opposing sides of the beam cross section rectangle being provided with openings (17, 18) each formed as a space between adjacent beam parts, and flange elements (26, 27, 28, 29) arranged at the edges of the U-profile plates which flanges abut the sides of the legs of the L-shaped beam portion, said flanges extending to the corners of the L-profiles and wherein the side of one leg of the L-profile contacts the side of the flange and is connected thereto by fasteners.

* * * * *